United States Patent [19]

Slowey

[11] Patent Number: 5,115,134
[45] Date of Patent: May 19, 1992

[54] PRECISION LOW ENERGY RADIATION DOSIMETRY SYSTEM

[76] Inventor: Thomas W. Slowey, 701 Ronnie Rd., Madison, Tenn. 37115

[21] Appl. No.: 594,891

[22] Filed: Oct. 4, 1990

Related U.S. Application Data

[63] Continuation of Ser. No. 275,286, Nov. 23, 1988, abandoned.

[51] Int. Cl.$^5$ .......................... G01T 1/02; H01J 47/02
[52] U.S. Cl. ..................................... 250/374; 378/161
[58] Field of Search ......................... 378/161; 250/374

[56] References Cited

FOREIGN PATENT DOCUMENTS 62-133377  6/1987  Japan ................................... 378/161

Primary Examiner—Constantine Hannaher
Attorney, Agent, or Firm—Mark J. Patterson; Edward D. Lanquist, Jr.

[57] ABSTRACT

A low energy radiation dosimetry system includes an ionization chamber with a beryllium window that is optimized for flat response in the range of 6.5 keV to 40 keV. A conductive carbon coating including lithium and fluorine provides secondary electron emissions to flatten response of the beryllium window in the desired radiation energy range without the use of external mathmetical correction factors.

4 Claims, 3 Drawing Sheets

PRECISION LOW ENERGY RADIATION DOSIMETRY SYSTEM

This is a continuation of application Ser. No. 275,286, filed on Nov. 23, 1988 now abandoned.

BACKGROUND OF THE INVENTION

The present invention relates to radiation dosimetry and specifically to systems which employ ionization chambers, and that are suitable for the precise dosage measurement of low energy radiation emitted by diagnostic and therapeutic mammography and other medical equipment.

It is well recognized in the medical community that the use of x-ray mammography is an important tool in the early diagnosis and treatment of breast cancer and similar conditions. Many physicians recommend yearly mammography screening for women in high risk groups. However, in recent years, a concern arose that the radiation levels emitted by mammography equipment during screening or therapy constituted a health hazard. Accordingly, mammography equipment was redesigned for use at lower radiation dose levels, in the range of 30 KVp to 50 KVp, as compared to 60 KVp to 150 KVp typical radiation energy levels in diagnostic radiology.

Coincident with the reduction in radiation dose levels in mammography was the need for dosimetry systems capable of measuring and calibrating the equipment used at these radiation levels to insure that safe levels were not exceeded and to accurately determine therapeutic doses. Thus, dosimetry equipment usable in mammography needed the capability of accurately and consistently measuring low energy radiation doses, as would be received by the breast.

The prior art recognized that small ionization chambers, contained in a breast phantom or other simulating device and used in conjunction with a charge accumulating/integrating-type dosimeter, could be used in this application. Typically, the prior art ionization chambers would include a biased charge collecting device mounted in a small box or cylinder, with a radiotransparent window exposed to the radiation source. Most such prior art chambers employed aluminized Mylar ® brand plastic film as a window material, the goal being minimal attenuation of low energy radiation. Although aluminized Mylar ® brand plastic film windows provided good low energy response, that response varied as a function of the energy level of the radiation. Polycarbonate was also used as a window material.

Unfortunately, the prior art ionization chambers do not provide a flat response. Therefore, at the low energy levels used in mammography, mathematical corrections must be used by the operator in order to provide the plus or minus 5% accuracy mandated by state and federal law. Also, aluminized Mylar ® brand plastic film windows, being only one to two mils thick, are extremely fragile and must be stretched to be attached to the chamber body. Further, if it is desired to take dose measurements in water, such as in a linear accelerator chamber used in electron beam therapy, a special protective cover for the fragile window must be used.

What is needed, then, is a dosimetry system which incorporates an ionization chamber that provides accurate and flat response, without the use of external mathematical correction factors, at low radiation energy levels and that includes an ionization chamber with a radiation window less susceptible to mechanical damage.

SUMMARY OF THE INVENTION

The dosimetry system as disclosed and claimed includes an ionization chamber coupled to a conventional electrometer. The radiation window covering the tissue equivalent body of the chamber is made of beryllium. The low level radiation response provided by the beryllium window is optimized by use of a coating made of carbon, lithium and fluorine.

DESCRIPTION OF THE PREFERRED EMBODIMENT

Figure 4:
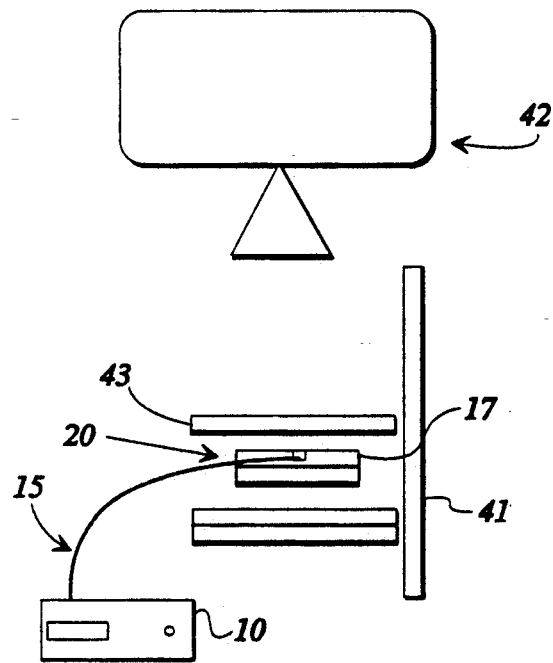
FIG. 4 is a schematic view of the dosimetry system in use.

As shown generally in FIG. 4, the dosimetry system of the present invention comprises a conventional electrometer 10, such as the Keithley 602 or the Model SH-1 from Precision Radiation Measurement, Inc., connected by triaxial electrical cable 15 to an ionization chamber 20 mounted to a support (not shown) or breast phantom 17.

Figure 1:
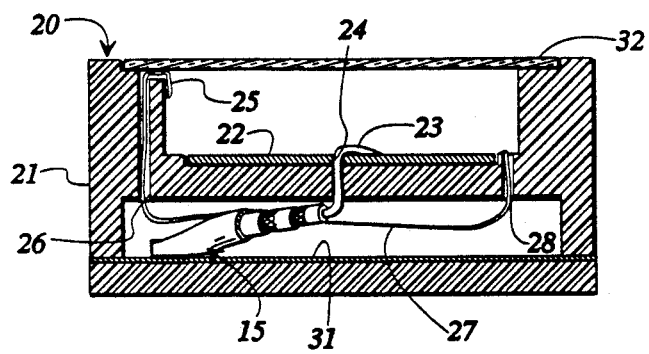
FIG. 1 is a side sectional view of the ionization chamber.
Figure 2:
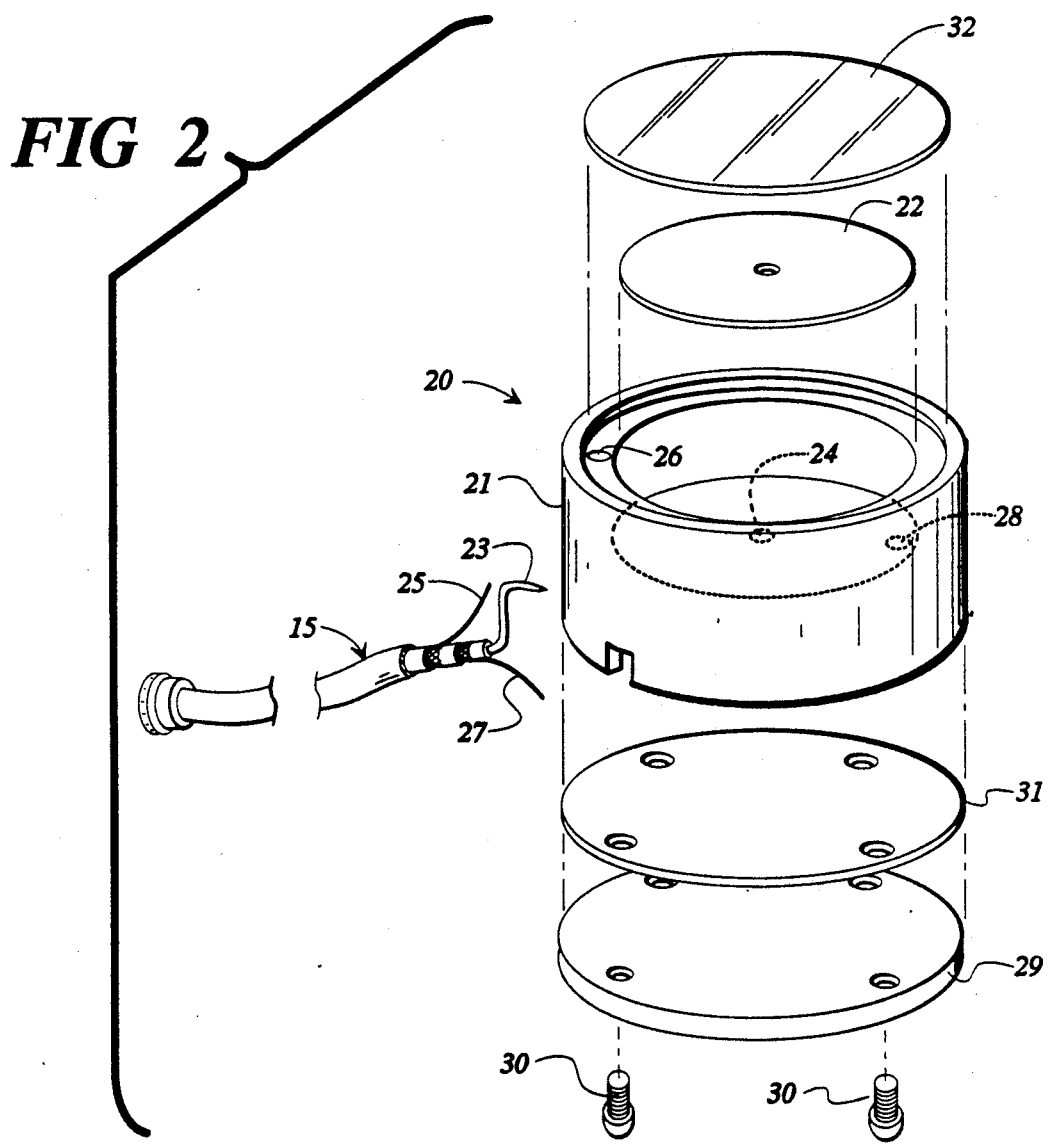
FIG. 2 is an isometric exploded view of the ionization chamber.
Figure 3:
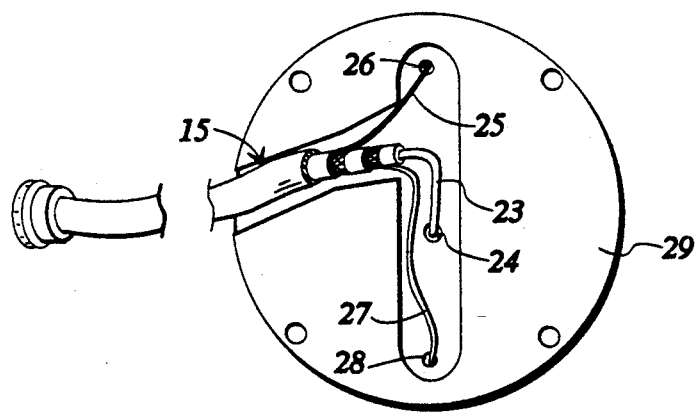
FIG. 3 is a bottom view of the ionization chamber.

As best seen in FIGS. 1, 2 and 3, the design and manufacture of chamber 20 is instrumental to the precision of the present invention. Body 21 of chamber 20 is made of a non-conductive human tissue equivalent material such as acrylic or polystyrene. A conductive carbon coating of approximately 1 mil thickness is generally applied to the interior surface of body 21. Plate 22, which is made of 10 mil polycarbonate and top-coated with conductive carbon, is electrically connected to the center, collector wire 23 of triaxial cable 15 via slot 24. The outer braid 25 of cable 15, which is TFE insulated 27 gauge wire, provides the bias voltage for chamber 20 and is connected to the vertical interior wall of body 21 through slot 26. The bare inner braid or guard wire 27 of cable 15 is connected to the lower inner surface of body 21 through slot 28. Conductive coating, of course, is cut away and eliminated from the interior of body 21 where necessary to electrically isolate the guard, collector, and bias circuits chamber 20 is open to the atmosphere because it has slot 24, 26, and 28.

The lower exterior surface of body 21, also carbon coated and grooved, secures cable 15 in conjunction with acrylic bottom disc 29 which is secured to body 21 with screws 30. Shielding disc 31, made of aluminized Mylar ® brand plastic film approximately 2 mils thick, is secured between bottom disc 29 and chamber body 21.

Attached to and covering the top of body 21 is radiation window 32, made of beryllium approximately 5 to 10 mils thick. Window 32 allows the penetration of radiation from the mammography x-ray device 42 with minimal attenuation. Beryllium is also ideal as a window material because of its high strength. However, used in pure form, beryllium does not have ideal flat response throughout the desired low energy level range, i.e., 6.5 KeV to 40 KeV. To counteract and adjust this, a coating compound was developed to provide secondary electron emissions in the portions of the desired range where the response of beryllium is deficient, thereby flattening the overall response curve in the range of interest.

It was found that in the preferred embodiment a coating made of carbon in an isobutyl vehicle, combined with 25% lithium and 25% fluorine will provide a flat response (plus or minus 3%) within the range of 6.5 KeV to 40 KeV, without the use of mathematical correction factors, assuming relatively stable temperature and pressure. However, experimentation further suggests that other elements with atomic numbers in the range of 3 to 14 could also be used in the carbon coating with success.

The coating of the preferred embodiment is compounded by adding 3 grams of lithium fluoride to five ounces of the carbon in isobutyl alcohol suspension. The coating is then hand-painted on the window.

Figure 5:
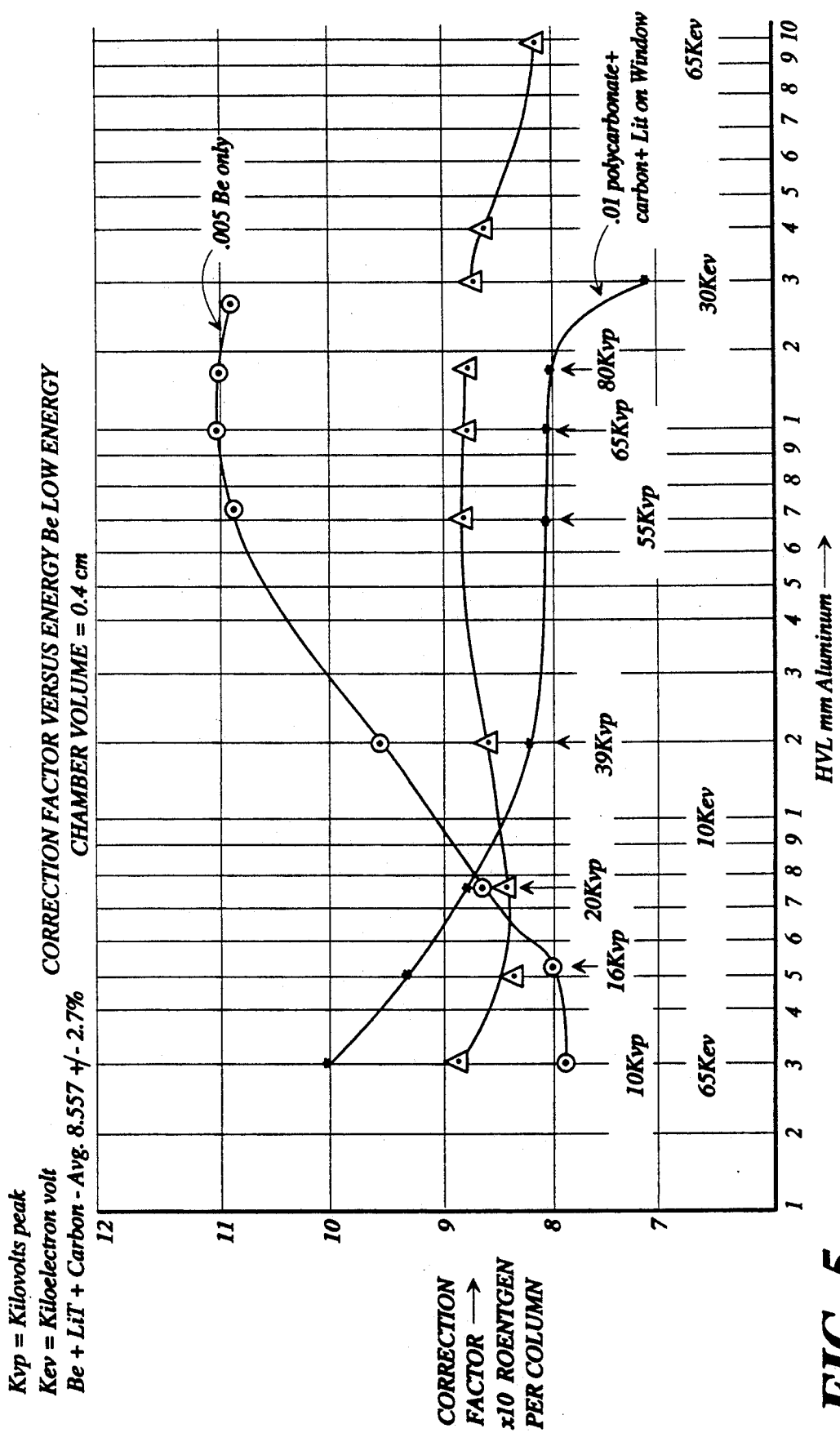
FIG. 5 is a graphic representation of the response of the preferred embodiment at various energy levels as compared to prior art ionization chambers.

FIG. 5 demonstrates graphically the comparative response of a low energy ionization chamber having an acrylic body with an active volume of approximately 0.4cm$^3$. The three curves plotted are for a 5 mil beryllium window with no coating, a 10 mil polycarbonate window with a carbon-lithium-fluorine coating, and a 5 mil beryllium window with a carbon-lithium-fluorine coating.

The operation of a low energy mammography dosimetry system is straightforward as shown in FIG. 4. Ionization chamber 20, which is approximately 28.8 mm in diameter with a total body 21 thickness of approximately 14 mm, is connected to a Precision Radiation Measurement MD-1 dosimeter 10 by a 2.2 meter low noise triaxial cable 15. The bias wire 25 is biased by adjustment of dosimeter 10 to at least −60 volts. Chamber 20 is then placed in the chamber portion of breast phantom 17 which is typically made of two sections of 12 cm×12 cm acrylic with a total thickness of 4.5 cm. The chamber 20 within phantom 17 is then placed on the top of cassette holder 40 of mammography unit 41 in the center of the beam from radiation source 42. Compression device 43 is then adjusted to the top of phantom 17. The mammography unit is then set to the photo-timing mode in accordance with the manufacturer's instructions, being sure that chamber 20 does not cover the photo-timing sensor. The chamber 20 is then exposed, and the surface exposure of the breast is measured by dosimeter 10. The chamber section of phantom 17 is then placed below the blank phantom section, and a mid-line dose is measured. The resulting readings (in Roentgen units) are then converted to rads, and temperature and pressure corrections are factored, if necessary.

It should also be noted that the improved ionization chamber of this invention can be used in other low energy dosimetry applications such as superficial radiation therapy machines or, in a waterproof version, in electron beam therapy measurements.

What I claim is:

1. A low energy radiation dosimetry system comprising:
   a. an electrometer-type dosimeter adapted for precise measurement and display of a low energy radiation dose level over a continuous range;
   b. an ionization chamber open to the atmosphere adapted for use in simulation of tissue radiation exposure comprising a non-conductive chamber body, charge collector means internal to said body, means for applying bias voltage to said charge collector means, and a beryllium radiation window covering one end of said body such window having a coating which is adapted, in cooperation with said window, to produce ideal flat response to radiation energy levels over the range 6.5 KeV to 40 KeV; and
   c. cable means connecting said charge collector means and said bias means of said chamber to said dosimeter.

2. The dosimetry system of claim 1 further comprising breast phantom means adapted for retaining said chamber within a mammography unit for fsurface and mid-line breat radiation dose measurements.

3. An improved precision, low energy ionization chamber adapted for use in a low energy dosimetry systems and including a chamber body, biased charge collector means, and means for external electrical connection of said biased charge collector means wherein said improvement comprises a coated beryllium radiation window covering one end of said chamber body, said coating adapted, in cooperation with ssaid window, to produce ideal flat response to radiation energy levels over the range 6.5 KeV to 40 KeV.

4. In an ionization chamber for use in low energy radiation dosimetry, a radiation window optimized for flat response in the range of 6.5 KeV to 40 KeV comprising a beryllium disc coated on its inner surface with a carbon compound which includes 25% lithium and 25% flourine.

* * * * *